United States Patent
Guy et al.

[11] 3,905,407
[45] Sept. 16, 1975

[54] TREE HARVESTER

[75] Inventors: Douglas Stanley Guy, St. Thomas; Ian McKenzie, Lambeth, both of Canada; Charles Robert Sturtz, Jr., Romulus, Mich.

[73] Assignee: Clark Equipment Company, Buchanan, Mich.

[22] Filed: May 25, 1973

[21] Appl. No.: 363,936

[30] Foreign Application Priority Data
Feb. 6, 1973  Canada .............................. 163290

[52] U.S. Cl. ............... 144/3 D; 144/2 Z; 144/34 E; 144/309 AC
[51] Int. Cl.² ................................ A01G 23/08
[58] Field of Search.... 144/2 Z, 3 D, 34 E, 309 AC, 144/34 R

[56] References Cited
UNITED STATES PATENTS

| | | | |
|---|---|---|---|
| 3,618,647 | 11/1971 | Stuart | 144/3 D X |
| 3,623,521 | 11/1971 | Shields | 144/3 D X |
| 3,643,709 | 2/1972 | McColl | 144/309 A C X |
| 3,643,711 | 2/1972 | Puna | 144/2 Z |
| 3,709,267 | 1/1973 | Kurelek | 144/3 D X |
| 3,720,248 | 3/1973 | Mellgren | 144/3 D X |
| 3,734,152 | 5/1973 | Shields | 144/3 D |

*Primary Examiner*—Donald R. Schram
*Assistant Examiner*—W. D. Bray
*Attorney, Agent, or Firm*—Jack E. Toliver

[57] ABSTRACT

A mobile tree harvester, especially on a wheeled frame, having tree severing, transferring and delimbing apparatus or processes combined. Specifically a harvester operating to cut, manipulate or transfer from a vertical to horizontal position and delimb full length trees at the site. Standing trees are severed at the ground by a cutter such as an hydraulically operated shear located at the front of the machine. A delimber, fixed in relation to the cutter and operating generally longitudinally of the machine, receives the severed tree, delimbs it out to usable length and then automatically tops off the rest. A tree transfer mechanism is operable between the cutter and delimber to grasp the severed tree above the cutter, lift it through a prescribed arc and deposit it on the delimber. An axial hold or clamp secures the tree against axial movement in the delimber while the cutter and transfer mechanism return for a second tree.

A preferred embodiment of the harvester has a combined processor able to swivel on the frame as a unit in a limited horizontal arc, about 35° total, and employs a crowd boom of restricted reach, about six to ten feet, to extend the cutter and transfer mechanism; the combined effect of which is to reduce the availability of trees in a given path of advance, this however increasing overall productivity of the machine by forcing it to rely on its greater mobility to clear a greater number of paths.

A number of improvements in various parts and subassemblies of the processor are also disclosed.

16 Claims, 15 Drawing Figures

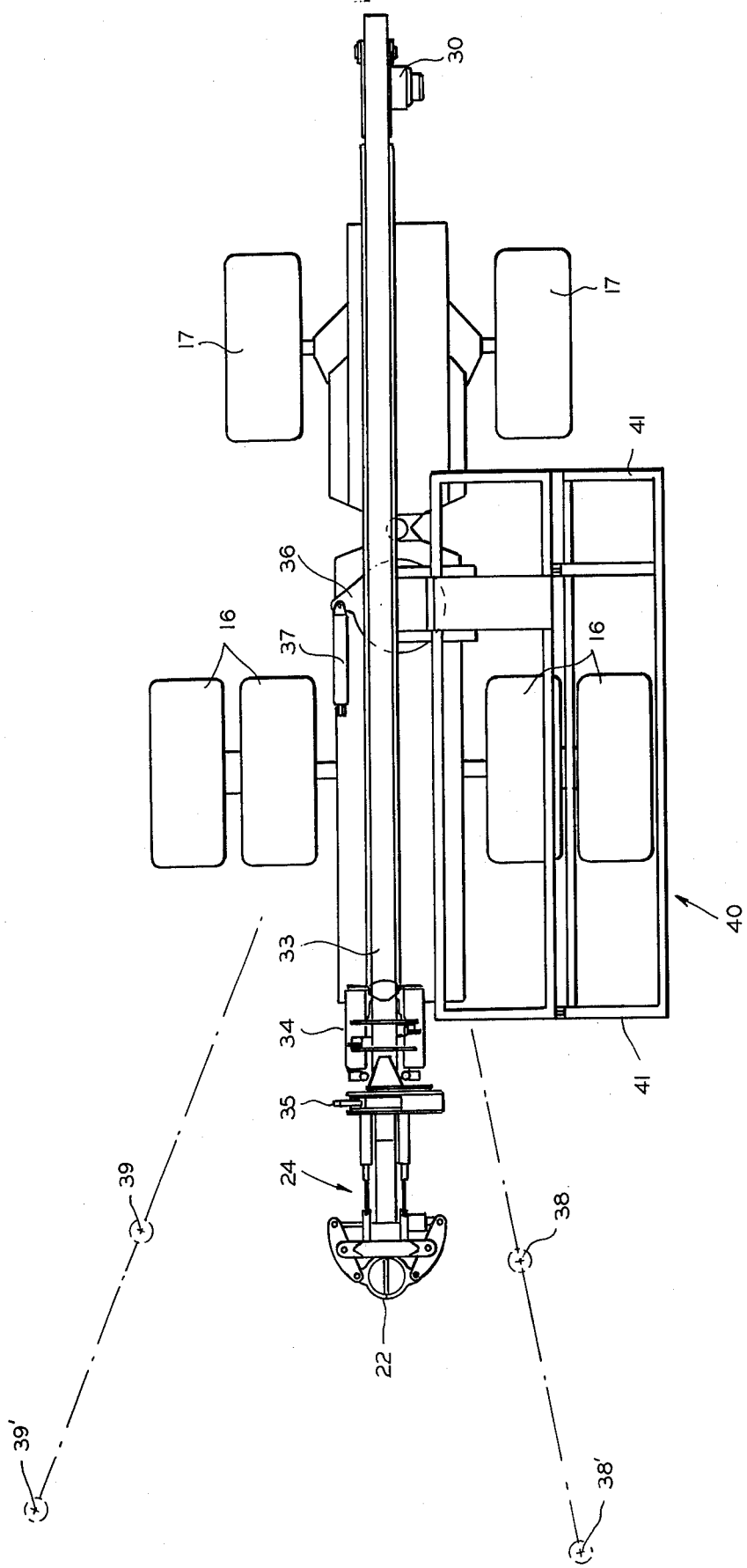

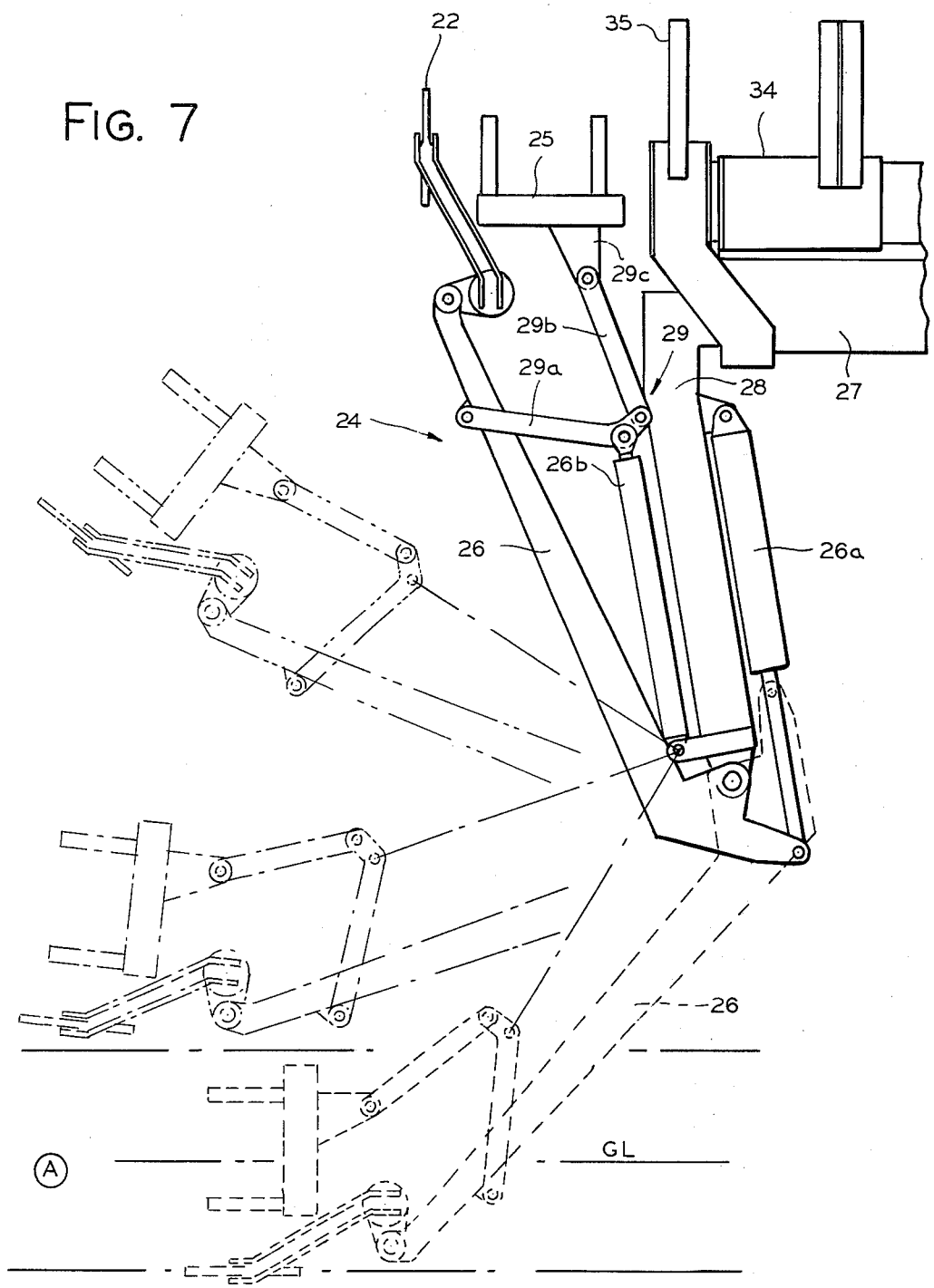

TREE HARVESTER

FIELD OF THE INVENTION

The invention pertains to the art of tree length harvesters and more particularly to harvesters of the so-called combined type i.e., combining several operations or processes such as shearing, delimbing, topping and bunking or storage of processed trees.

BACKGROUND OF THE INVENTION

The limited productive capacity achieved with a chain saw for felling and a separate mechanical processor for removing the limbs and topping trees has long been realized as a limitation on the over-all output of logging operations.

Increased productivity using mobile harvester vehicles adapted to be driven into the timber area where the operator selects trees for processing and moves from tree to tree on the site has been a relatively recent development.

DESCRIPTION OF THE PRIOR ART

One type of tree length harvester delimbs and tops the standing tree, fells it and then piles the processed tree lengths to facilitate skidding or extraction by other machines. The productive capacity of these harvesters, while greater than a chain saw, is still relatively low because one tree at a time is processed, i.e., sequential operation.

Another type of tree length harvester first fells the tree and then removes the limbs. Separate mechanisms for felling, delimbing and topping are employed which permit distinct functions to be performed in overlapping timed relation, i.e., the felling head may be returned for a second tree while the first tree is being delimbed and topped. As increase in productivity over the harvester having purely sequential operation is thus possible because of partial simultaneous operation. Machines which purport to process trees simultaneously have been proposed where a felling head is mounted on a telescoping boom rotating in a horizontal plane independently of a delimber beam. The boom may swing 90° in either direction, and must always return into alignment with the delimber beam.

Analysis of the time-function of the latter machines has indicated that the greatest consumption of time occurs during the felling cycle, i.e., severing and transferring the trees from a vertical to horizontal position. Therefore, the harvester which offers maximum productivity would be one which minimizes the felling cycle time.

SUMMARY OF THE INVENTION

A tree length harvester is provided comprising a mobile frame carrying combined processor means operating to sever, transfer, delimb, top and bunk full trees felled by the machine. The processor includes a tree severing unit (such as a shear) fixed in relation to the limb removal apparatus (delimber beam) having means (delimber and topping knives) operating in a substantially horizontal mode to stip limbs from the felled tree and remove the unuseable top and an accumulator (rack) for storage of fully processed trees on the machine. A tree transfer mechanism (crowd boom and grapple arm) interposed between the tree severing unit and limb removal apparatus grasps the severed tree and transposes it into horizontal alignment with the limb removal apparatus solely as a function of movement of a mechanical linkage.

The felling cycle time is the time required for selecting and shearing a standing tree and thereafter transferring or manipulating it onto the delimber beam in a horizontal position. A combination of features contribute to the over-all reduction in the felling cycle in the present invention.

In the preferred embodiment of tree harvester disclosed herein, the tree severing unit (shear), limb removal apparatus (delimber beam) and tree transfer mechanism (crowd boom and grapple arm) are fixed in a common plane such that no lateral movement of the severed tree occurs during the felling cycle. Thus the grapple space above the shear need be no wider than required to "balance" the tree on the shear blade.

A further feature is that the tree transfer mechanism includes a crowd boom, i.e., a longitudinally reciprocated beam. More specifically, the crowd boom telescopes into a stationary main beam and slides in and out on rollers carrying the grapple arm and shear with it. The reach of the crowd boom is preferably limited to about six feet.

Furthermore, the limb removal apparatus (delimber beam) is stationary relative to the main beam such that the entire processor swivels or slews on the frame. However, the slewing arc is preferably limited to about thirty-five degress.

Specifically, it is the objective to limit the extension or reach of the crowd boom in conjunction with the slewing angle to establish optimum felling conditions. The operator is required to focus his attention in a relatively narrow felling path just wide enough to clear a path for the machine. The reduction in the area of operation actually increases productivity by forcing the operator to rely on the machines greater mobility. That is by cutting a narrower path, but cutting a greater number of paths in a given time, the combined felling time will be reduced and over-all productivity will be increased.

In addition, the felling time per tree is a factor. In the present invention a narrow cutting zone is established. A severed tree is transposed from an essentially vertical to a substantially horizontal position solely by action of a mechanical linkage without requiring concentration or attention by the operator regardless of the position of the tree base relative to the ground line of the machine within this narrow cutting zone. That is, a finite cutting zone extends above and below the ground line of the machine. Trees growing within this zone are considered available for harvesting.

Specifically, a parallel linkage on the grapple arm maintains a fixed attitude of the shear and grapple within the limited cutting zone. This reduces the problem of parallax also since the operator can easily judge the height of the shear from the ground and judge the degree of tilt of the tree. However, and more important, the parallel linkage pivots with the grapple arm and causes the tree, grapple and shear to take a prescribed arc ending automatically in alignment with the delimber beam. Thus the operator is free immediately upon shearing the tree to concentrate on the next tree. In other words, adjustment of the tree attitude in transferring to the delimber beam is entirely the function of the parallel linkage.

It is also contemplated that several novel features of the harvester reside in the various combination of parts

DESCRIPTION OF THE DRAWING

FIG. 2 is a plan view of the tree harvester in FIG. 1 indicating the optimum slewing angle of about 35° for maximum productivity;

FIGS. 4b and 4c are respectively sectional plan views separately of the shear and grapple of the head in FIGS. 4, 4a;

FIG. 6a is a diagram depicting the drive drum cable reaving for the delimber beam drive drum on the end of the main beam and FIG. 7 depicts four positions of the tree transfer mechanism from a lowered position within the cutting zone to an uppermost position where the tree, shear and grapple are in alignment with the delimber carriage.

DESCRIPTION OF A PREFERRED EMBODIMENT

Figure 1:
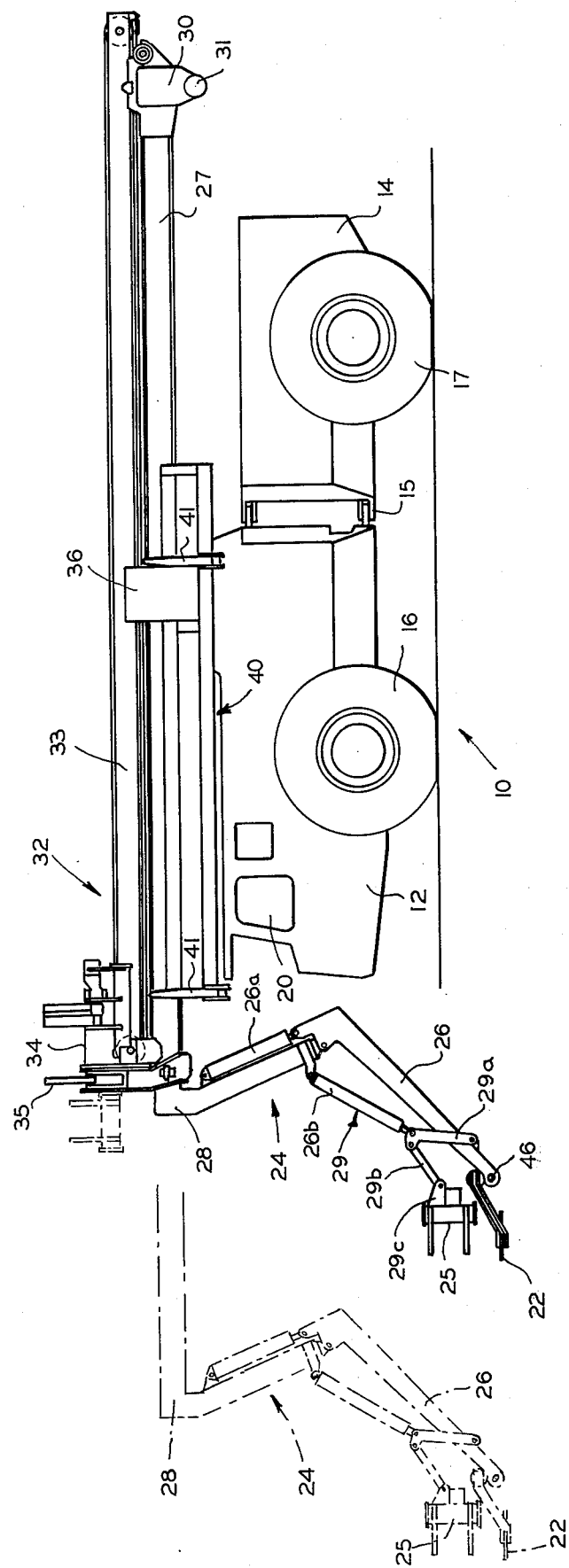
FIG. 1 is a side elevational view of the tree harvester showing the extended position of the crowd boom in dot-dash lines and the lowered position of the grapple arm.

FIG. 1 shows a tree harvester 10 having an articulated front and rear section 12, 14 hinged on a common steering axis 15. Two engines (not shown), one mounted in the rear section 14 and the other in the front section 12, deliver power to wheels 16, 17 and operate the machine components. An operator's cab 20 at the fore part of the front section 12 contains an operator's seat and controls from which the operator is in a good position to observe the shear 22 and operate the controls. A tree transfer mechanism 24, which includes the shear 22, also provides a tree grapple 25 above the shear, a grapple arm 26, a crowd boom 28, the forward most position of which is depicted by the dot-dash lines in FIG. 1, and a parallel linkage 29. The crowd boom 28 telescopes into the front end of a stationary main beam 27. At the opposite end of the main beam 27 is a cable drive drum assembly 30 powered by a reversible hydraulic motor 31 that drives the limb removal mechanism 32 which includes a delimber beam 33 rolling on the main beam 27 and a delimber and topping carriage 34 which travels on the delimber beam 33 in a manner described more in detal hereinafter. An axial hold or clamp 35 secured to the front of the main beam 27 grips the butt end of a severed tree deposited in the carriage 34 by the tree transfer mechanism 24 (only the dotted line of the tree grapple 25 being shown in FIG. 1 in the fully raised position of the grapple arm 26). The clamp 35 holds the tree against axial movement while the delimber and topping knives on the carriage 34 removes the limbs and top off the tree as the carriage travels down the delimber beam. A bunk or accumulator 40 for collecting delimbed and topped trees dropped from the delimber beam includes hinged arms 41 which may be lowered to drop a bundle of processed trees on the ground.

The combined processor includes the shear 22, tree transfer and limb removal mechanisms 24, 32 and bunk 40 all of which swivel as a unit with the main beam 27 on a trunnion 36. A trunnion cylinder 37 (FIG. 2) is secured to the frame on one end and may be extended or retracted causing the combined processor to slew or swivel in a limited horizontal arc of about 35° or just wide enough to clear a path for the machine to drive through as indicated in FIG. 2. Locating points 38, 39 indicate the left and right inner limits of the arc made by the center of the shear 22 with the crowd boom 28 in its fully retracted position while locating points 38', 39' are on the left and right ends of the outer arc made by the shear when the crowd boom is fully extended.

The foregoing general description of the various components will now proceed with a more detailed description with occasional reference back to FIGS. 1 and 2 where needed.

THE SHEAR

Figure 4:
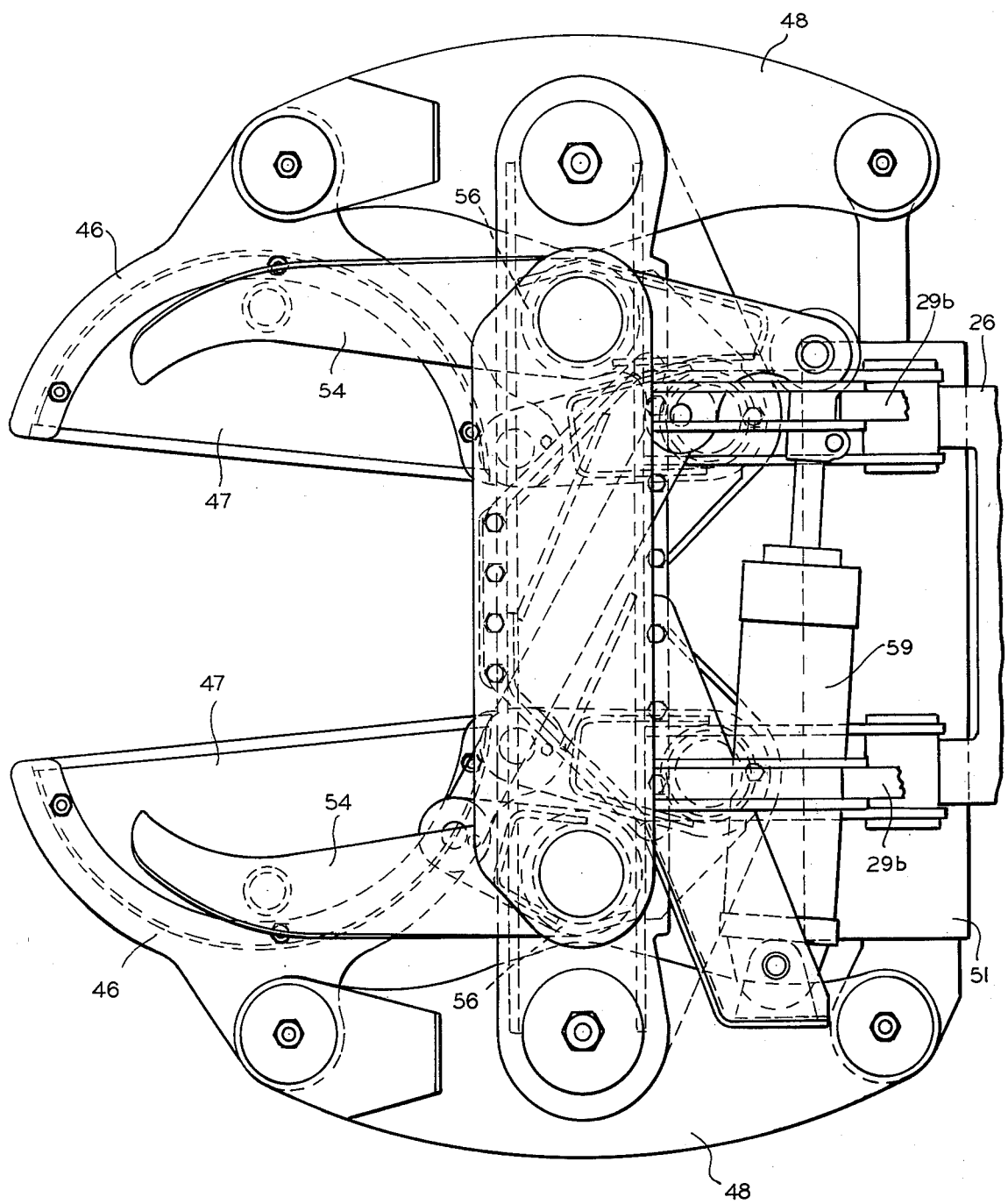
FIGS. 4 and 4a are respectively plan and side views of the tree shear and grapple head.
Figure 4A:
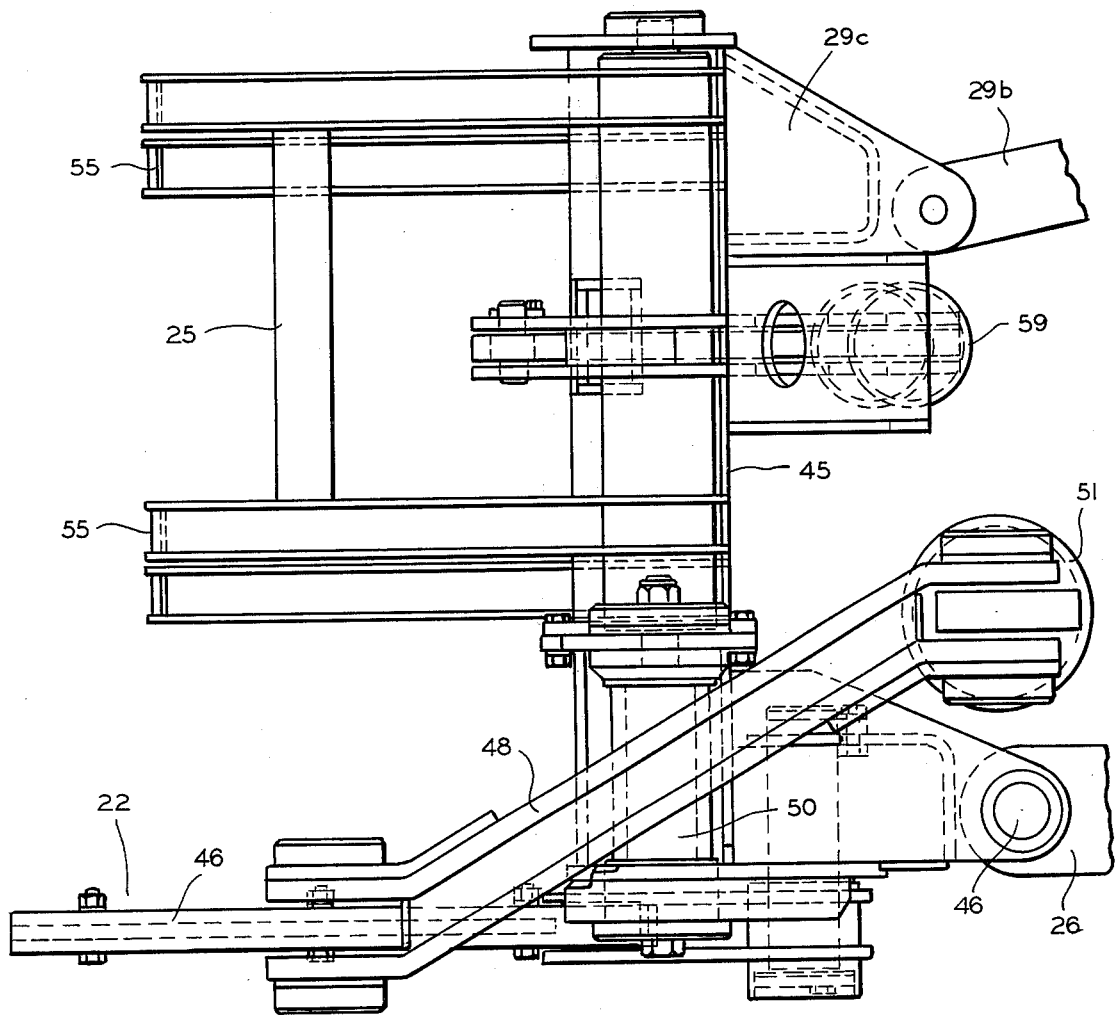
Figure 4C:
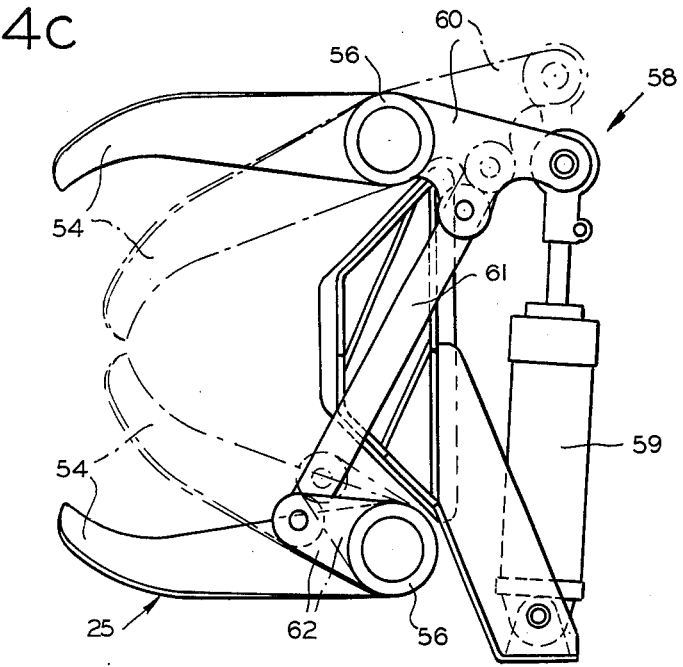
Figure 4B:
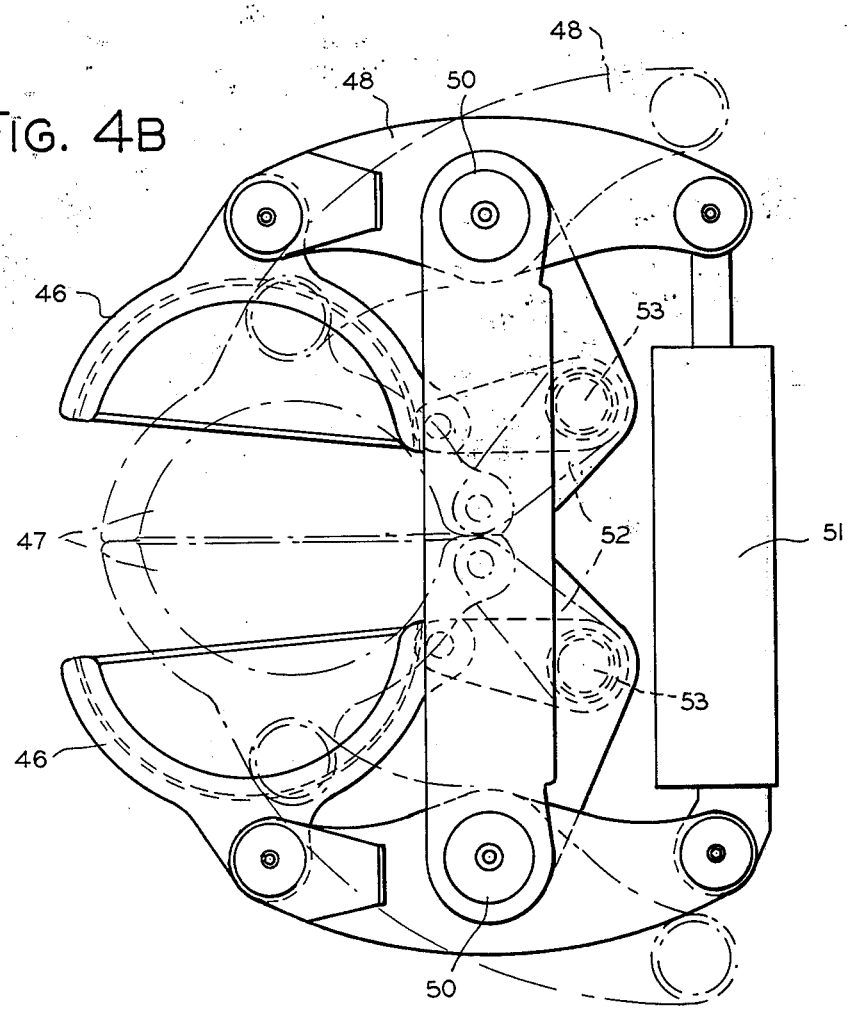

Referring to FIGS. 4, 4a, 4b shear 22 is mounted on a generally vertical frame 45 pivoted at 46 on the end of the grapple arm 26. The shear 22 comprises a pair of blade holders 46 carrying semicicular blades 47 shown in FIG. 4 in the open condition. Holders 46 are pivoted on one end of a yoke 48 pivotally mounted to the frame 45 intermediate its ends at 50. Extending between the rear ends of the yokes 48 is an hydraulic cylinder 51. It is important to note that the cylinder 51 is at a higher elevation than the shear blades 47 (FIG. 4a) and the yokes descend from the mounting at each end of the cylinder 51 to the plane of the shear blades 47 at the front where the holders 46 are pivotally mounted. It is also an important feature of the shear that the shear blades 47 close with a positive arc (FIG. 4b) i.e., there is little or no tendency for the blades to come together progressively toward the front or have a scissors action which would tend to push the tree out or force the shear off the tree. The positive closing action of shear blades 47 is a result of the geometry of the linkage including secondary links 52 pivotally mounted to the frame at 53 on one end and on the other end carrying the inner ends of the blade holders 46. It will thus be seen that the closing of the blades 47 is a compound movement involving the main yokes 48 controlling the major arc of the blades with the secondary links 52 swinging inwardly controlling the heal of the blade holders 46 as the cylinder 51 is extended on the cutting stroke. One advantage of having the shear cylinder 51 on a different plane from the blades 47 is to avoid snow packing, i.e., repeated closing motion would otherwise tend to pack snow or mud behind the secondary links 52 jambing the shear or causing damage.

THE TREE GRAPPLE

Referring again to FIGS. 4, 4a and to FIG. 4c in particular, the tree grapple 25 is shown mounted on the upper part of frame 45 above the shear 22. A pair of grapple arms 54, each having vertically spaced fingers 55 (FIG. 4a), is provided above the shear on grapple sleeves 56. A novel linkage 58 serves to actuate the arms 54 as the grapple cylinder 59 is extended or retracted. The linkage 58 includes a crank 60 moving with the sleeve 56 of one arm. A cross link 61 extends across and connects with a crank 62 on the opposite sleeve 56 of the other grapple arm such that by extending the cylinder 59 from the position shown in FIG. 4c, the grapple arms 54 will swing inwardly together to the dot-dash line position depicted in FIG. 4c.

The shear cylinder 51 and grapple cylinder 59 are independently controlled by an hydraulic circuit which will allow the operator to close the grapple while the shear is open or vice versa or close both simultaneously.

Noted especially is the compact arrangement of the shear and grapple. That is the severed tree will be held by the spaced fingers 55 of the grapple arms while the severed butt end rests on the closed blades of the shear below, but the spacing between the grapple fingers 55 is only sufficient to "balance" the tree and a wider spacing is not necessary to provide lateral support for swinging the tree for reasons as will be explained below.

THE DELIMBER KNIVES

Referring now to FIGS. 5, 5a, 5b and 5c, the delimber and topping carriage 34 has rollers 65 rotatably mounted on the carriage frame 66 which enables it to be pulled along the upper web 63 of the delimber beam 33. One end of a cable 126 is anchored at the front of the carriage frame for pulling it along the beam 33 in the delimbing cycle while a cable 132 is anchored at the opposite end for returning it to the start position depicted in FIGS. 1 and 2.

A set of curved delimber knives includes a stationary bottom knive 70 and a pair of pivoted knives 72 which close upon the tree substantially encircling it in conjunction with the bottom knife 70. The curved cutting edge 73 on the bottom knife forms, together with the cutting edges 74 on the pivoted knives, a substantially continuously adjustable cutting primeter that follows the contour and taper of the tree from adjacent the severed butt end to the top. Flanking the delimber beam on each side and extending longitudinally of the delimber carriage is a pair of cylindrical housings or tubes 75 held by a pair of transversely extending cross webs 76. A pair of sleeves 77 is journaled between the cross webs 76, one on each side of the delimber axis, carrying the pivoted knives 74 in staggered relationship to permit closing on the tree. Each sleeve has a crank 78 at one end which is linked by means of a connecting rod 79 to a heavy coil spring 80 housed in each of the cylindrical housings 75. Stationary on the main beam 28 is a cam block 82 having a vertical abutment 83. Rollers 84 riding on the cam surfaces 81 of the cam block 82 actuate a cocking mechanism, including levers 85, which simultaneously, torsionally cocks each spring 80. In the process, collars 86 rotate so as to pivot the knives 72 to the fully opened or backed-off position (FIG. 5b) when the rollers 84 are resting on the lands 87 (FIG. 5a) of the cam block 82. It is important to note that the pivoted knives 72 are cocked in the relatively short distance travelled by the rollers 84. This has the advantage that limbs growing close to the base of the tree will not be missed since the pivoted knives 72 engage the tree quickly.

THE TOPPING KNIVES

Figure 5B:
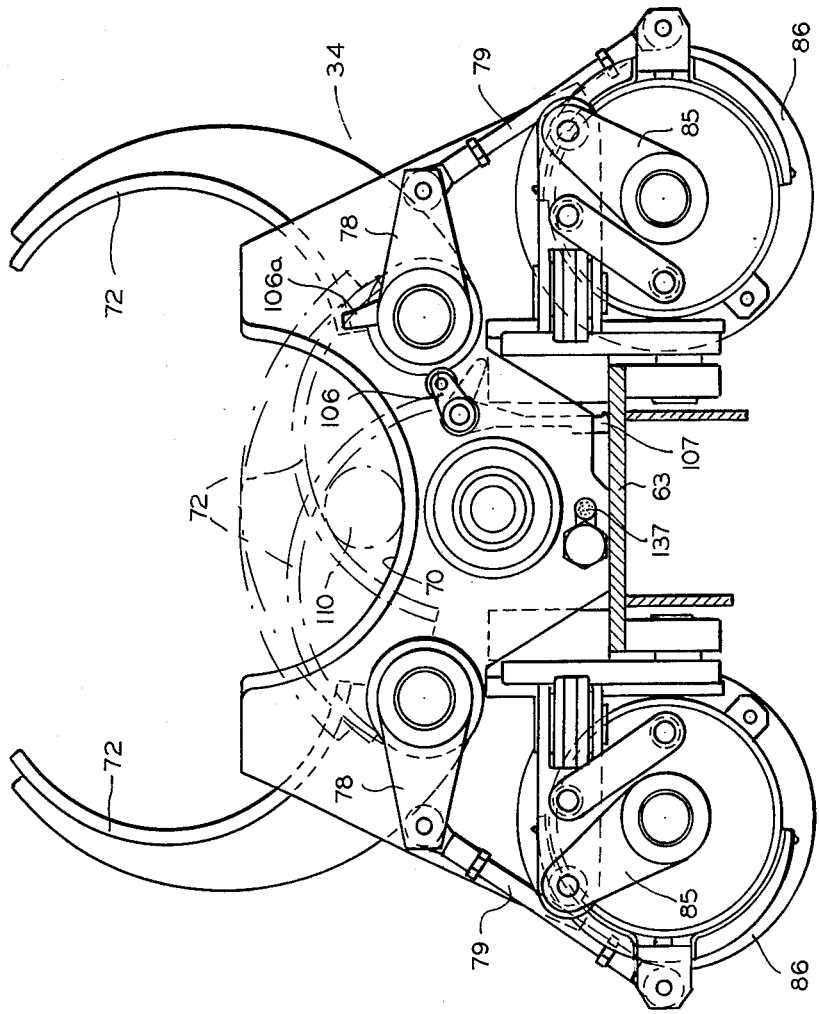
FIGS. 5, 5a and 5b are respectively side plan and end views of the delimber carriage.
Figure 5C:
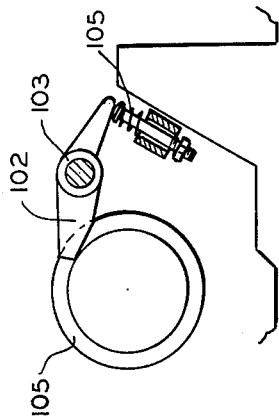
FIG. 5c is a fragmentary sectional view showing a portion of the topping knife release mechanism of the delimber carriage.
Figure 5A:
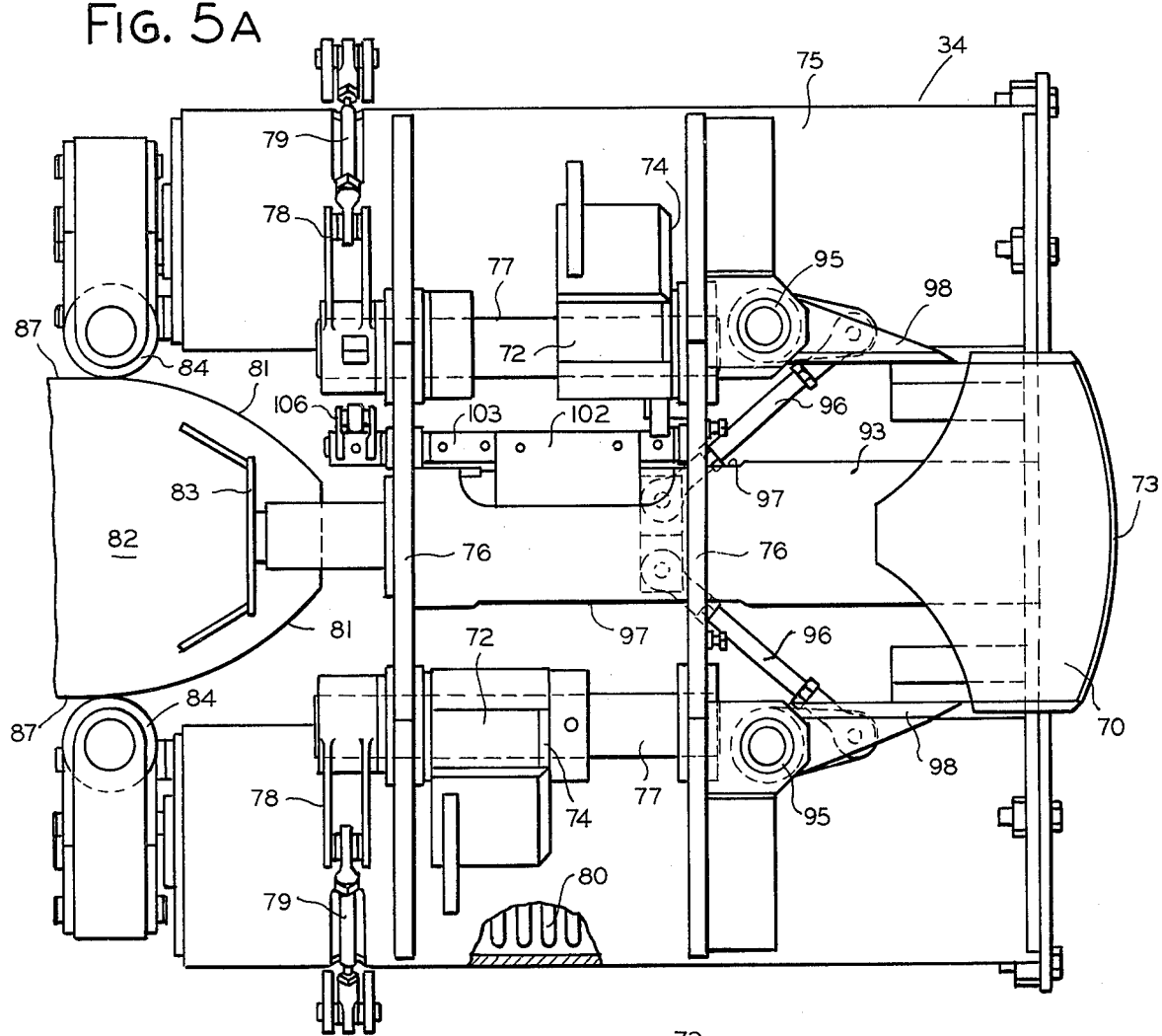
Figure 5:
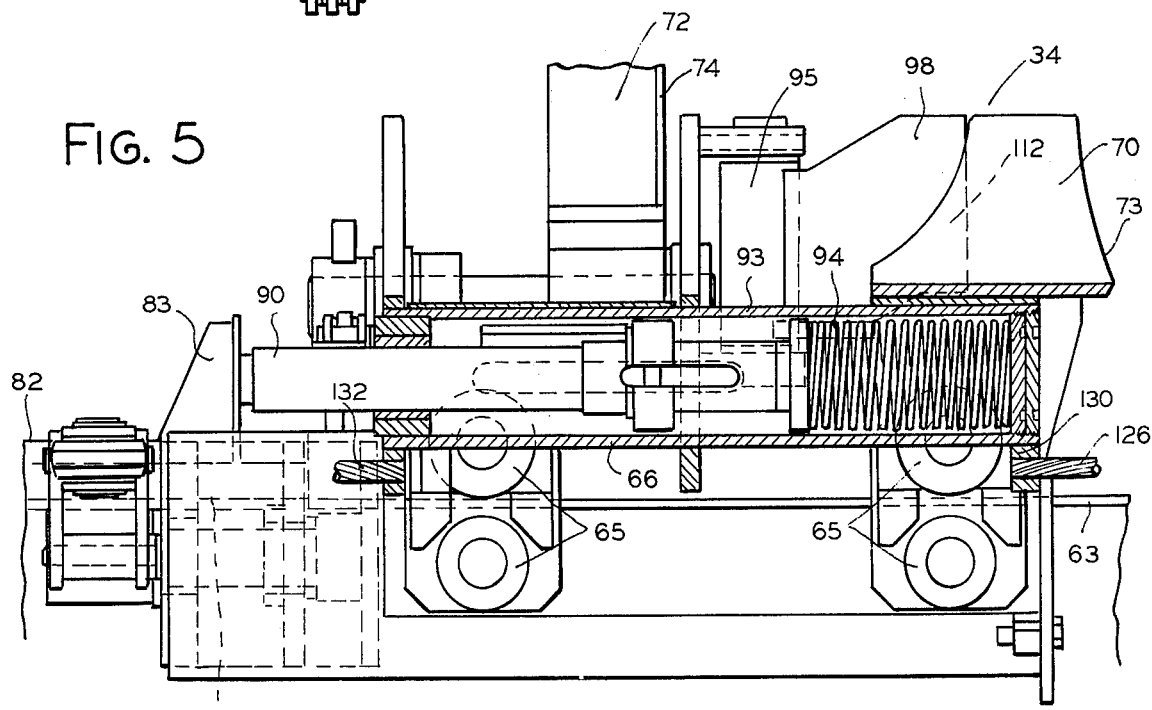

A plunger 90 is engageable with the abutment 83 and depresses a coil spring 94 within a barrel 93 of the delimber and topping carriage 34. In the fully compressed state of the spring 94 a pair of connecting rods 96 extending through slots 97 on opposite sides of the barrel 93 are carried by the plunger 90 rotating topping knife sleeves 95 on each side of the carriage thereby cocking the topping knives 98 in the fully opened position as shown in FIGS. 5, 5a. In this position, a dog 102 (FIG. 5c) mounted on a rotatable sleeve 103 drops behind a shoulder 105 on the plunger 90 holding it in the depressed condition. The topping knives 98 are held open by the dog until a trigger mechanism is operable to rotate the sleeve 103 against the force of spring 105 releasing the dog 102. The trigger mechanism comprises a pair of actuators 106, 107 (FIG. 5b) on the sleeve 103 either of which is capable of tripping the topping knives. While the carriage 34 travels on the delimber beam, either one of two things can happen to release the dog 102. Either the carriage travels the length of the tree to the point where its size 110, as depicted in FIG. 5b, is no longer great enough to be useful and the remainder can be topped off, in which event the pivoted delimbing knives 72 close down upon the tree to the point where a detent 106a on the one crank 78 engages the actuator 106 releasing the dog 102 allowing the topping knives to pivot inwardly; or, the length of the tree is great enough that its size at the end of the delimber beam exceeds the minimum size 110 and the actuator 107 is tripped by a cam (not shown) near the end of the delimber beam such that the dog 102 is released. In either case, the spring 94 is released causing the topping knives 98 to swing inwardly behind the bottom delimbing knife 70 into engagement with the tree. The power of the spring 98 need be only great enough to bring the knives 98 against the tree and thereafter the movement of the carriage relative to the tree forces the knives through the tree.

THE DELIMBER DRIVE

Figure 6:
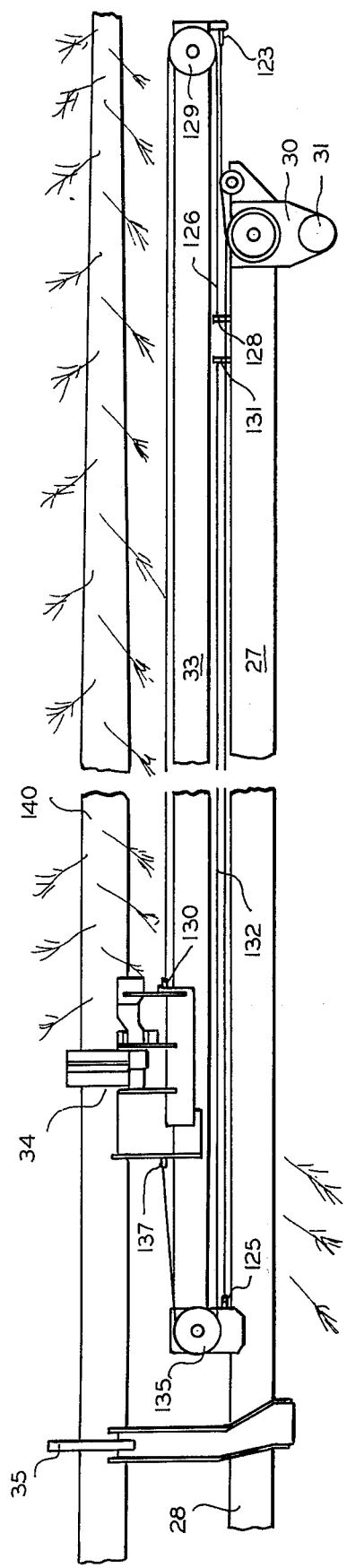
FIG. 6 illustrates the relative positions of the delimber carriage and delimber beam and the associated cable drive therefor after a short travel of the carriage in a delimbing stroke.
Figure 6A:
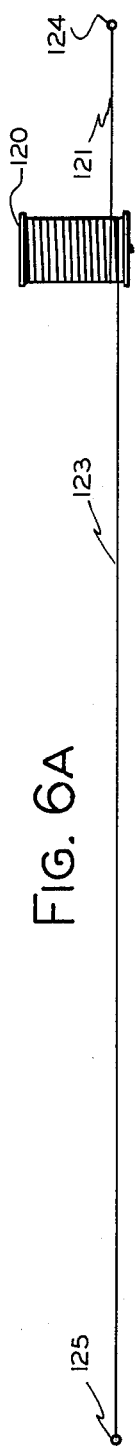

Referring to FIGS. 6, 6a there is a cable drive for the delimber beam 33 and carriage 34 driven by the reversible hydraulic motor 31. The motor drives a drum 120 (FIG. 6a) rotatably mounted in the drive mechanism 30 on the end of the stationary main beam 27. Two cables 121, 123 are anchored on the drum 120, one on each side. The opposite end of cable 121 is attached at 124 to the rear of the delimber beam while the opposite end of cable 123 attaches at 125 to the front of the beam. Rotation of the drive drum 120 clockwise winds the cable 123 into the grooves of the drum as the cable 121 is unwound from the same groves propelling the delimber beam 33 rearwardly. Reversing the motor 31 drives the drum 120 in the opposite direction returning the beam. The use of one drum for two cables effectively reduces the cable angle to the beam axis and lessens the possibility of a malfunction or entangling branches.

The cable system (FIG. 6) for the delimber and topping carriage 34 includes the cable 126 which is anchored at 128 to the main beam 27 at one end. It travels around a sheave 129 rotatably mounted at the end of the delimber beam and is anchored at the opposite end 130 to the front of the carriage 34. A second cable 132 is anchored at 131 to the main beam. It passes around a sheave 135 on the opposite end of the delimber beam and is anchored at 137 to the rear of the delimber carriage.

It will be seen that the cables 126, 132 are fixed relative to the delimber beam. Thus the delimber and topping carriage 34 is pulled along the delimber beam by its extension relative to the main beam. The delimber beam and delimber carriage are shown in their relative positions in FIG. 6 after only a short initial extension, it being appreciate that the carriage moves twice as far as the beam for a given extension. At full extension, the carriage 34 will have traveled the full length of the beam delimbing the tree 140 as it proceeds and topping off the end as the prescribed length or diameter is reached.

THE GRAPPLE ARM AND CROWD BOOM

In FIGS. 1 and 2 the tree transfer mechanism 24 is shown to include the crowd boom 28 which telescopes in the front end of the main beam 27. The grapple arm 26 is pivotally mounted at the distal end of the downwardly and rearwardly directed extension of the crowd boom. The crowd boom will extend or retract, as depicted in FIG. 1, when an hydraulic cylinder (not shown) housed in the main beam is actuated by the operator. The arm 26 extends generally downwardly and forwardly from the stationary pivotal mounting on the crowd boom. Pivotal motion of the arm is accomplished by extension or retraction of an hydraulic cylinder 26a mounted behind the downward extension of the crowd boom.

The crowd boom extension also provides a second stationary pivot axis on which is connected a pair of hydraulic cylinders 26b in side-by-side relationship. The cylinders 26b may, however, be solid links if desired without detracting from the invention as will become apparent. The parrallel linkage 29 includes the cylinders 26b, arm 26 and a pair of links 29a pivotally mounted at lower ends on the arm 26 and at their upper ends to the cylinders 26b. A second pair of links 29b connects at the upper ends to the links 29a and extends forwardly connecting at the lower ends to spaced bosses 29c on the shear and grapple frame 45.

It is significant at this point to note that the arm 26 together with the cylinders 26b and the links 29a form a quadric chain or four-bar linkage. This produces parallel motion when pivoting the arm 26 such that less than 90° of rotation of the arm 26 accomplishes a full quarter turn displacement of the shear, grapple and tree as depicted in FIG. 7. FIG. 7 is a diagram depicting the relative positions of the arm 26, cylinders 26b and links 29a, 29b at each of four different locations starting from the lower-most position within the cutting zone A, which extends above and below the ground line of the machine GL, going to a first intermediate raised position, a second intermediate raised position, and finally to a fully raised position. The tree, severed and ready to lift, is slightly inclined to the rear with respect to vertical in the lower position such that the tree has a slight clockwise movement relative to the grapple arm pivot. At the first intermediate raised position the attitude of the tree has only slightly increased the degree of tilt and in the cutting zone A, remains substantially unchanged due to the parallel linkage 29. The tilt gradually increases as the radial position of the arm 26 changes such that at the uppermost position of the arm, the tree has assumed a substantially horizontal alignment with the axis of the delimber carriage 34 solely by virtue of the geometry of the linkage. The cylinders 26b are extended only when it is desired to pick up a fallen tree or cut a tree tilted away from the machine otherwise a solid link could be substituted without changing the movement of the linkage. This relieves the operator of the responsibility of orienting the tree and material reduces the time lag in the tree transfer operation.

Figure 3:
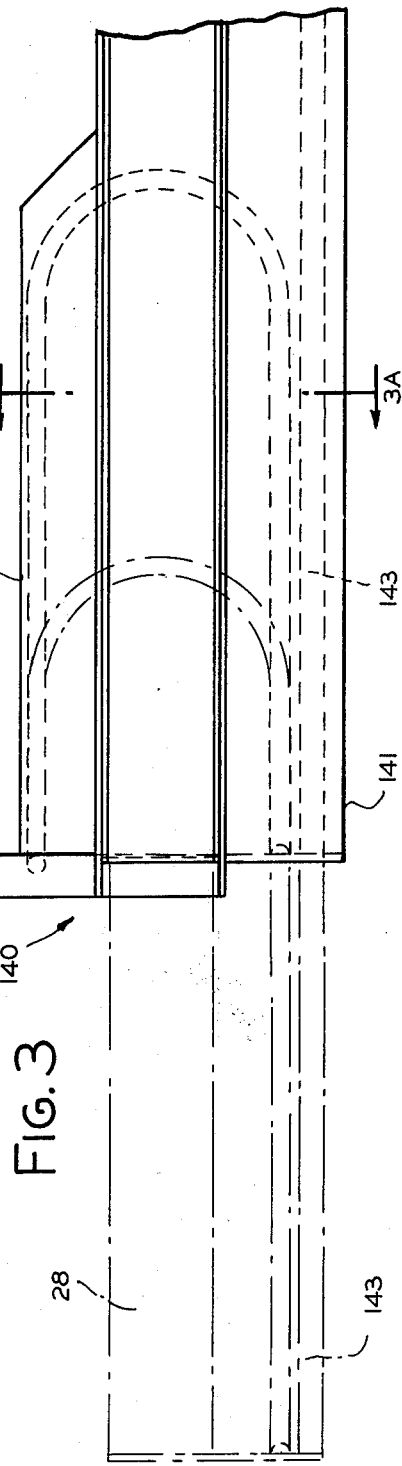
FIG. 3 is a partial horizontal sectional view showing the hose rack and crowd boom fully retracted in full lines and extended in dot-dash lines.
Figure 3A:
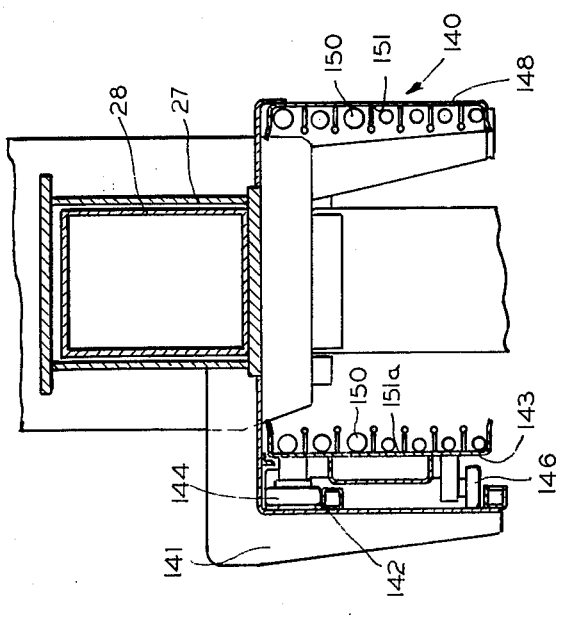
FIG. 3a is a partial cross sectional view of the hose rack and crowd boom.

Referring to FIGS. 3, 3a the hydraulic cylinders at the end of the crowd boom are supplied by hydraulic hoses housed within a hose rack 140 mounted beneath the main beam 27. A rack guard and guide 141 is attached to the main beam providing a longitudinally extending trackway 142. A movable rack section 143 carries a roller 144 which rolls on the upper trackway 142. Lower rollers 146 roll on the rack guard 141 and absorb any side thrusts. Opposite the movable rack 143 is a stationary rack 148. Hydraulic hoses 150 lie in stacked loops within channels 151 and the opposite channels 151a of the movable rack section.

The movable rack section 143 is secured at the front to the end of the crowd boom and travels with it. The hydraulic hoses are confined to the channels 151, 151a in the retracted position, but as the boom is extended, that portion of the hoses stored in the fixed rack section 148 is pulled by the movable rack section out of the channels 151. The movable rack section is approximately twice as long as the fixed rack section giving it the linear capacity to accept the hoses from the fixed rack section in the fully extended position of the crowd boom as depicted in FIG. 3.

OPERATION AND METHOD

Reference will now be made primarily to FIGS. 1, 2, 6 and 7. It will be assumed that the tree 140 (FIG. 6) had been growing within the slewing angle and reach (FIG. 2) of the processor as indicated by the points 38, 38', 39, 39' and at a ground elevation within the cutting zone A (FIG. 7) which may be either above or below the ground line of the machine and the operator has manipulated the grapple 25 and the shear 22 so as to grasp the tree and has severed it near the ground. If the cylinders 26b (FIG. 7) had been extended to accommodate a tree growing at an angle away from the machine, they will be retracted as the crowd boom is returned to the rearmost position as shown in FIG. 1. Referring now to FIG. 7 it is only necessary for the operator to actuate the cylinder 26a at this point and the tree will automaticlly be lifted and oriented in the horizontal position with the delimber carriage 34. The axial clamp 35 will have been opened to receive the tree. It is important to note that the stack height of the shear 22 grapple 25 and clamp 35 extends only a relatively short distance up the tree and well below the point where one normally encounters any limbs growing. Moreover, the butt of the tree which extends between the shear 22 and the axial clamp 35 does not project forwardly of the shear 22 when in its lowered position even with the crowd boom fully retracted so that interference with a tree being processed does not occur when slewing either to the right or left.

At this point, the axial clamp is actuated to firmly grip the tree and the grapple 25 released. Cylinder 26a is now retracted returning the grapple arm 26 for a second tree. While this is going on, the operator merely actuates the automatic delimber control which starts the hydraulic motor 31 driving the delimber beam 33 and the delimber carriage 34 (FIG. 6) stripping off the limbs of the tree 140 which is, of course, clamped against axial movement by the clamp 35. The tree, however, is not held against lateral movement since the clamp 35 permits a limited pivotal motion and as the delimber carriage 34 travels along the tree it will bring the tree into alignment with the beam 33 or possibly where the tree stem is crooked, cause the tree 140 to swing back and forth as the carriage moves longitudinally. At the point of travel of the delimber carriage where either the tree diameter is too small to warrant further processing or where the carriage has reached the linear limit set for cam actuation, the topping knives 98 will be released to close upon the tree and top off the remaining unusable portion. This portion is carried rearwardly with the delimber carriage and drops off the back of the machine while the now precessed tree stem is clear of the delimber carriage. Clamp 35 is now opened permitting the stem to roll off of the delimber beam into the bunk 40. At this point the delimber carriage and delimber beam are recycled and the machine is ready for a second tree which has, in the meantime, been cut and is being held upright by the grapple arm 26 in readiness to again load the delimber.

From the foregoing description of the operation of the machine it will be understood that a primary advantage of the machine is that it offers maximum productivity by minimizing the felling cycle time. This is accomplished partly by limiting the slewing angle to that just sufficient to clear a path to drive the machine forward and by restricting the reach of the crowd boom, preferably less than 10 feet and 6 feet is believed to be about optimum. In addition, the shear, tree transfer and delimber mechanisms are all in a common plane such that it is not necessary for the operator to have to reposition the tree for delimbing after shearing. Furthermore, the felling cycle time is materially reduced by the parallel linkage which permits the operator to upright the tree after cutting and then rely on the linkage to align it in the horizontal axis of the delimber carriage without further attention or concentration on the part of the operator.

While only a single embodiment of our invention has been described in detail, it will be understood that each detailed description is intended to be illustrative only and that various modifications and changes may be made to our invention without department from the spirit and scope of it. Therefore, the limits of our invention should be determined from the attached claims.

The embodiments of the invention in which an exclusive property or privilage is claimed are defined as follows:

1. A tree harvester comprising a mobile frame carrying tree processing means to sever a standing tree, fell the tree backward over the harvester and remove limbs therefrom, said tree processing means comprising an elongated member mounted on the frame, a second elongated member mounted on the frame for reciprocation relative to the first, a trunnion mounting for both members on which they swivel together, tree severing means mounted on the second elongated member, limb removal means operable longitudinally on the first elongated member to remove limbs from a tree, tree transfer means mounted on the second elongated member for pivoting a severed tree backward over the machine into a position lengthwise of the first elongated member and clamp means on the first elongated member for holding the severed tree stationary.

2. A tree harvester as defined in claim 1 wherein the tree processing means includes tree severing means pivotally mounted on the second elongated member, said tree severing means, limb removal means and tree transfer means all acting in a common vertical plane such that lateral movement of a severed tree is not required.

3. A tree harvester as defined in claim 2 wherein the tree transfer means is operable between the tree severing means and limb removal means for grasping a tree closely adjacent the severed end and transferring it to the limb removal means by lifting the severed tree through an arc having a substantially greater vertical component of motion than horizontal component through a cutting zone extending above and below the ground line of the machine.

4. The tree harvester as defined in claim 3 wherein said tree transfer means includes first and second arms pivoting from the end of said second elongated member on spaced upper and lower pivots imparting a backward turning motion to said tree such that a severed tree will overlie said first elongated member when the arms are pivoted upward.

5. The tree harvester as defined in claim 4 wherein said second elongated member has a downwardly extending end portion and said first arm is longer than the second and is pivotally mounted on the distal end of said end portion defining a first pivotal location, said second arm mounted on said end portion at a second pivotal location spaced above the first and linkage means pivotally interconnecting said first and second arms at third and fourth pivotal locations at the opposite ends of the first and second arms.

6. A mobile processor for full length trees mounted on a wheeled frame, said frame having a front section carried by ground engaging wheels and a rear section hinged about a vertical axis to the front section carried also by ground engaging wheels and a pair of steering cylinders, one on each side of the hinge axis actuatable for pivoting one frame section relative to the other for maneuvering the machine through timber areas, a longitudinally stationary beam member mounted on the front section extending lengthwise of the frame, an elongated boom member reciprocally mounted on the front section for extension and retraction in a direction forwardly of said beam member, a trunnion mounting for both the beam and boom members on the front section providing an axis of rotation parallel to the hinge axis between the front and rear sections about which both the beam and boom members are rotatable as a unit, a tree felling head mounted on the boom member operable to sever a standing tree adjacent the base and hold the tree stem in a substantially upright position, limb removal means mounted on the beam member operable longitudinally thereof for delimbing a severed tree stem, and tree transfer means operable for transferring the tree stem from the upright position to a position generally overlying the beam member whereby said felling head means is free to sever a second tree while said limb removal means delimbs the first tree.

7. The processor according to claim 6 wherein a tree accumulator member is mounted on the front section alongside said beam member and is rotatable as a unit with the beam and boom members said trunnion mounting providing rotational movement for the beam boom and accumulator members a limited extent to the right or left of the vehicle center line whereby said beam, boom and acculator members are free to rotate as the mobile processor moves on to the next tree to be severed.

8. The processor according to claim 7 wherein said boom member is reciprocable between a retracted position adjacent the front end of said beam member and an extended position forwardly thereof and said tree transfer means including first means pivoting in a vertical plane on the boom member and pivotally supporting said felling head means in one position adjacent the base of the tree and in a second position elevated and rotated backward felling the tree lengthwise of the main beam and second means stationary adjacent the front of the main beam operable for holding the tree stem on the main beam when released by said felling head means and for releasing and directing the tree into said accumulator member after delimbing.

9. A tree harvester comprising a mobile frame an elongated member mounted on the frame, a second elongated member reciprocally mounted for extension and retraction forwardly of the first elongated member, a trunnion mounting on the frame for both elongated members providing that the two are stationary relative to each other for rotational movement, limb removal means operating longitudinally on the first elongated member to strip limbs from felled trees, felling head means including a shear and grapple operable to sever a tree adjacent the ground and hold it in an upright position tree transfer means pivotally mounted on said second elongated member having first and second pivots, first and second arms pivoting in a vertical plane about said first and second pivots, said first arm having a pivotal attachement at the opposite end adjacent the lower end of said felling head means and said second arm having a pivotal connection at its opposite end with the felling head spaced above said first arm pivot connection imparting a backward turning movement to a severed tree in transposing it from an upright position held by the felling head means to a raised position lying lengthwise of said first elongated member.

10. A tree harvester according to claim 9 wherein said topping means operable after said limb removal means has traveled a predetermined length of the tree stem for cutting off the upper portion thereof.

11. A tree harvester according to claim 10 wherein said first arm is longer than the second, the pivotal connection at the end of the second arm with said felling head means comprising a link pivotally connecting the end of the second arm intermediate the ends of the first arm so as to impart to the felling head means a backward turning movement as the first and second arms pivot upwardly.

12. A tree harvester as defined in claim 10 wherein the angle of rotation of said trunnion mounting is not substantially greater than the width necessary to clear a path for the machine to travel through.

13. A combined tree harvester comprising a mobile frame having front and rear, wheeled frame sections pivotally connected about a vertical axis, a pair of steering cylinders, one on each side of the axis operable for turning one frame section relative to the other to maneuver said frame, two independent power sources, one in the front and one in the rear frame section, a trunnion on the front frame section having a vertical axis of rotation, a stationary beam mounted on said trunnion rotatable thereon in a horizontal arc providing a first degree of movement in a plane sufficiently above the ground line to provide clearance for said wheels, a crowd boom telescoping in the front end of said stationary beam and providing a second degree of movement in a fore and aft direction from a retracted position adjacent the front frame section to an extended position, a grapple arm pivotally mounted on the end of said crowd boom and extending downwardly therefrom when lowered to a position adjacent the ground, a first hydraulic cylinder connected between the crowd boom and grapple arm operable to pivot said arm in a vertical plane providing a third degree of movement, a combined shear and grapple head pivotally mounted on said arm, a second hydraulic cylinder connected between the arm and said shear and grapple head operable to rotate said head about a horizontal axis providing a fourth degree of movement, said second, third and fourth degrees of movement being performed in a substantially vertical plane through said stationary beam, a delimber beam reciprocably mounted relative to said stationary beam and extensible rearwardly thereof, a delimber and topping carriage having means engageable with the tree for removing limbs along the stem and topping off the uppermost portion of the tree reciprocally mounted on the said delimber beam, drive means for the delimber beam and carriage, a stationary clamp mounted on the main beam in front of said delimber beam and carriage and operable between an open position for receiving a tree and a closed, clamped position restraining a severed tree against axial movement as said carriage travels to remove the limbs and top of said tree and the stack height of said head, clamp and carriage in the raised position of said grapple arm being sufficently compact such that delimbing commences closely adjacent the butt end of the tree.

14. The harvester as defined in claim 13 wherein one power source is connected to said delimber drive means and said hydraulic cylinders and the other power source is connected for driving said wheels whereby the vehicle may be maneuvered while a tree is being processed.

15. The harvester as defined in claim 14 wherein a bunk is attached along one side of the stationary beam and is movable therewith, said bunk having a pair of pivoted arms which in the raised position accumulate tree stems in the delimbed and topped condition and in the lowered position drop said stem into a pile on the ground suitable for skidding.

16. A mobile tree harvester having a generally longitudinally extending processor, a reciprocally mounted boom movable relative to said processor and tree grapple and severing means carried on said boom having hydraulic cylinder means for operating said grapple and severing means characterized in that a plurality of hydraulic hoses containing hydraulic fluid are connected to a source of hydraulic fluid and to said hydraulic cylinders, a hose rack including a first stationary rack section mounted on said processor, an extendible section mounted on said boom being of sufficiently greater length than said stationary rack section so as to store substantially the entire length of said hoses, and a plurality of longitudinally extending channels in each rack section holding said hoses in stacked loops arrayed such that as the boom is extended and retracted, portions of said hose loops are transferred from one rack section to the other.

* * * * *